E. S. CUNNINGHAM.
ANIMAL TRAP.
APPLICATION FILED NOV. 24, 1915.
1,180,909.
Patented Apr. 25, 1916.
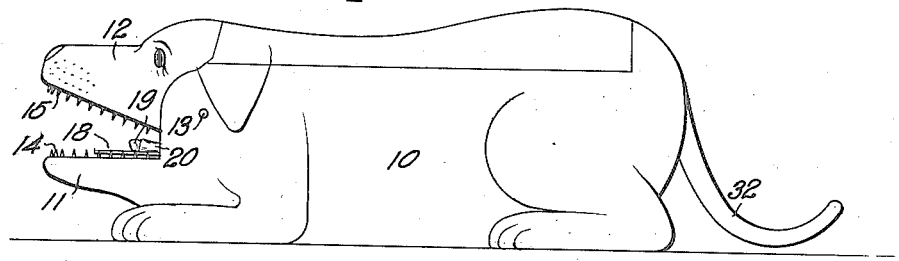
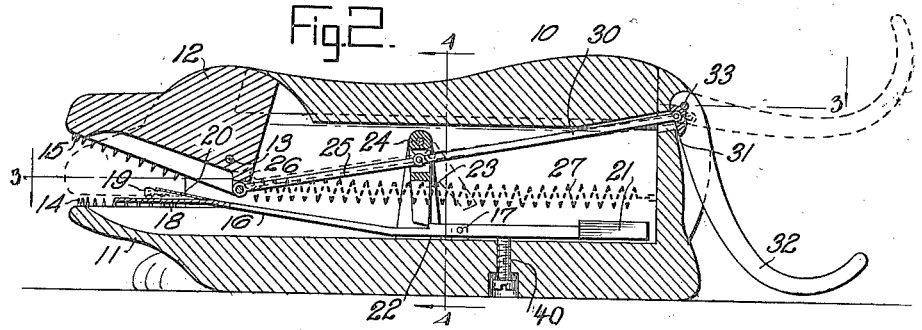
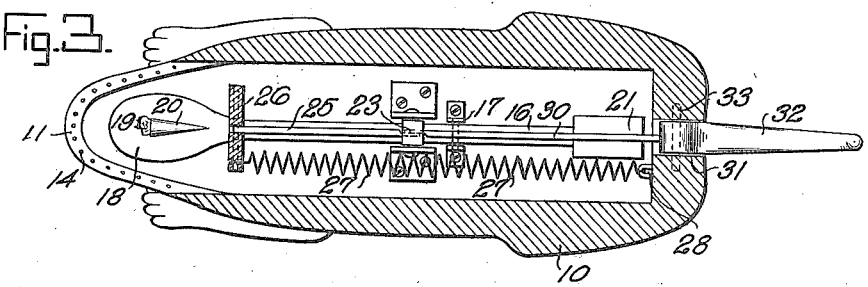
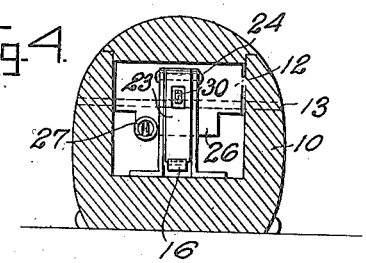
WITNESSES
INVENTOR
E. S. Cunningham
BY
ATTORNEYS

UNITED STATES PATENT OFFICE.

EDWIN SCOTT CUNNINGHAM, OF MANSFIELD, ILLINOIS.

ANIMAL-TRAP.

1,180,909.

Specification of Letters Patent.

Patented Apr. 25, 1916.

Application filed November 24, 1915. Serial No. 63,156.

*To all whom it may concern:*

Be it known that I, EDWIN S. CUNNINGHAM, a citizen of the United States, and a resident of Mansfield, in the county of Piatt and State of Illinois, have invented a new and Improved Animal-Trap, of which the following is a full, clear, and exact description.

The object of the invention is to provide a new and improved animal trap arranged to permit of readily setting it without danger of injuring the fingers, to allow releasing the dead animal without touching it, and to prevent the animal from reaching the bait thus allowing use of the bait for a considerable length of time without re-baiting after each capture.

In order to produce the desired result, use is made of a pair of jaws, of which one is fixed and the other is movable and pressed on by a spring, a counterbalanced trigger or bait lever provided at its forward end with means for holding the bait and extending between the jaws, a sear or releasing arm adapted to engage the said trigger to hold the bait end thereof in raised position, and a link connecting the said movable jaw with the said sear.

A practical embodiment of the invention is represented in the accompanying drawings forming a part of this specification in which similar characters of reference indicate corresponding parts in all the views.

Figure 1 is a side elevation of the animal trap in set position; Fig. 2 is a longitudinal central section of the same; Fig. 3 is a sectional plan view of the same on the line 3—3 of Fig. 2; and Fig. 4 is a cross section of the same on the line 4—4 of Fig. 2.

The housing 10 of the animal trap is preferably in the outline of a dog or other animal, as indicated in the drawings, and the said housing 10 is provided at its forward end with a fixed jaw 11 and a movable jaw 12 fulcrumed at 13 on the housing to allow of swinging the jaw 12 into open or closed position. The jaws 11 and 12 are provided with teeth 14 and 15 for securely holding the captured animal between said jaws, as hereinafter more fully explained. Within the housing 10 extends longitudinally a trigger or bait-carrying lever 16 fulcrumed at 17 in the housing and provided at its forward end with a plate 18 for supporting the bait 19 extending partly under a retaining lug 20 struck up on the plate 18 to securely hold the bait in place on the plate 18. When the trigger 16 is in set position the bait 19 appears between the jaws 11 and 12 with the bait 19 approximately at a level with the top of the fixed jaw 11 so that an animal can readily pass between the jaws and onto the plate 18 to impart a downward swinging movement to the trigger 16 to raise the rear weighted end 21 off a regulating set screw 40 positioned in the bottom of the housing 10.

The trigger 16 is provided immediately in front of its fulcrum 17 with a shoulder 22 adapted to be engaged by a sear 23 fulcrumed at its upper end at 24 in the casing to swing clear of the shoulder 22 whenever the forward end of the trigger 16 is swung downward by the animal stepping onto the plate 18 supporting the bait 19. The sear 23 is connected by a link 25 with a projection 26 on the fulcrum end of the pivoted jaw 12 and to which projection 26 is attached a spring 27 extending rearwardly within the housing and having its rear end attached to a staple 28 or other attaching means secured to the housing 10.

A link 30 is pivotally connected with the sear 23 and extends rearwardly through an opening 31 arranged in the rear end of the housing 10, and the rear end of this link 30 is pivotally connected with an operating arm 32 fulcrumed at 33 on the housing 10. As shown in the drawings, the operating arm 32 represents the tail of the dog. The links 25 and 30 are preferably in alinement with each other, as plainly indicated in Fig. 2, so that when the arm 32 is in raised position, as indicated in dotted lines in Fig. 2, and a downward swinging movement is given to the said arm then the jaw 12 is swung into open position against the tension of its spring 27 and at the same time the sear 23 is engaged with the shoulder 22 of the counterbalanced trigger or bait lever 16. When the pressure on the arm 32 is released the trap is set with the jaw 12 in open position. Now in case an animal steps on the plate 18 a downward swinging movement is given to the front end of the sear 18 to disengage the shoulder 22 from the sear 23 whereby the latter is released and with it the jaw 12 which now swings shut by the action of its spring 21 thus engaging the animal between the jaws 11 and 12 and their teeth 14 and 15.

It will be noticed that by the arrangement described the operator can readily set the trap without danger of injury to the fingers as it is only necessary to swing the arm 32 downward until the sear 23 engages the shoulder 22 of the trigger 16. In a like manner the trapped animal can be readily removed on opening the jaws 12 by depressing the arm 32 and shaking the housing to dislodge the trapped animal.

The animal trap shown and described is very simple and durable in construction and composed of comparatively few parts not liable to get out of order.

Having thus described my invention, I claim as new and desire to secure by Letters Patent:

1. An animal trap, comprising a housing having a fixed jaw and a spring-pressed pivoted jaw, the jaws being adapted to co-act to catch the animal between them, a trigger pivoted in the housing and extending lengthwise therein, the forward end of the trigger being provided with bait-holding means, a sear fulcrumed in the housing and adapted to engage the said trigger to hold the latter in set position, and a link connecting the sear with the said spring-pressed pivoted jaw.

2. An animal trap, comprising a housing having a fixed jaw and a spring-pressed pivoted jaw, the jaws being adapted to co-act to catch the animal between them, a trigger pivoted in the housing and extending lengthwise therein, the forward end of the trigger being provided with bait-holding means, the rear end of the said trigger being provided with a counterweight and the trigger having a shoulder in advance of its fulcrum, a sear fulcrumed in the housing and adapted to engage the said trigger shoulder, and a link connecting the sear with the said pivoted jaw, and means for adjusting the position of the forward end of the trigger.

3. An animal trap, comprising a housing having a fixed jaw and a spring-pressed pivoted jaw, the jaws being adapted to co-act to catch the animal between them, a trigger pivoted in the housing and extending lengthwise therein, the forward end of the trigger being provided with bait-holding means, the rear end of the said trigger being provided with a counterweight and the trigger having a shoulder in advance of its fulcrum, a sear fulcrumed in the housing and adapted to engage the said trigger shoulder, a link connecting the sear with the said pivoted jaw, an operating arm fulcrumed on the rear of the said housing, and a link connecting the said arm with the said sear.

In testimony whereof I have signed my name to this specification in the presence of two subscribing witnesses.

EDWIN SCOTT CUNNINGHAM.

Witnesses:
  JOHN G. MYERS,
  FREDERICK A. NASH.